United States Patent [19]

Itoh et al.

[11] 4,046,727

[45] Sept. 6, 1977

[54] THERMOSETTABLE ACRYLIC RESIN COMPOSITION FOR POWDER COATING

[75] Inventors: Iko Itoh; Yasuhiko Inoue; Shojiro Ito; Kazumitsu Kawamura, all of Niihama, Japan

[73] Assignee: Sumitomo Chemical Company, Limited, Osaka, Japan

[21] Appl. No.: 490,998

[22] Filed: July 23, 1974

[30] Foreign Application Priority Data

July 25, 1973 Japan .................................. 48-84350

[51] Int. Cl.$^2$ ..................... C08L 33/02; C08L 33/14; C08L 63/08; C08L 63/10
[52] U.S. Cl. ......................... 260/28.5 R; 260/30.6 R; 260/31.2 R; 260/31.6; 260/31.8 E; 260/32.6 R; 526/16; 526/51; 526/56
[58] Field of Search ............... 260/80.72, 80.8, 80.81, 260/78.5 R, 79.3 M, 78.4 EP, 78.4 E, 30.6, 31.6, 31.8 E, 33.4 EP, 33.6 EP, 33.8 EP, 28.5 R, 835, 836; 526/16, 51, 56

[56] References Cited

U.S. PATENT DOCUMENTS

| | | | |
|---|---|---|---|
| 3,242,123 | 3/1966 | Mayfield et al. | 260/80.8 |
| 3,563,953 | 2/1971 | Lehmann et al. | 260/80.72 |
| 3,784,501 | 1/1974 | Pettit | 260/31.6 |
| 3,803,111 | 4/1974 | Munro et al. | 260/80.8 |
| 3,843,612 | 10/1974 | Vogel et al. | 260/78.5 R |
| 3,845,010 | 10/1974 | Labana et al. | 260/80.72 |
| 3,847,863 | 11/1974 | Labana et al. | 260/80.72 |
| 3,857,905 | 12/1974 | Blackley et al. | 260/80.72 |

FOREIGN PATENT DOCUMENTS

| | | | |
|---|---|---|---|
| 499,491 | 1/1954 | Canada | 260/80.72 |

*Primary Examiner*—Allan Lieberman
*Attorney, Agent, or Firm*—Stevens, Davis, Miller & Mosher

[57] ABSTRACT

A thermosettable acrylic resin composition for powder coating comprising a mixture consisting essentially of (A) 100 parts by weight of an acrylic resin having a glass transition temperature of 10° to 75° C. and containing (a) 2 to 28 % by weight of a monomeric component containing epoxy group and (b) 0.1 to 8 % by weight of a monomeric component containing carboxyl or acid anhydride group, the gram equivalent ratio of said carboxyl groups to said epoxy groups contained in said acrylic resin being in the range from 1/2 to 1/20 (provided that the gram equivalent of an acid anhydride group is assumed to be equivalent to 2 gram equivalents of the carboxyl group) and (B) 0.5 to 25 parts by weight of a curing agent capable of crosslinking said acrylic resin (A). On being baked at 150° to 220° C. for 10 to 50 minutes, this composition gives a coating film excellent in strength, adherence, and surface leveling.

18 Claims, No Drawings

THERMOSETTABLE ACRYLIC RESIN COMPOSITION FOR POWDER COATING

This invention relates to a thermosettable acrylic resin composition for powder coating. More particularly, this invention relates to a thermosettable acrylic resin composition capable of forming a coating film excellent in strength, adherence, and surface leveling.

Powder coatings have recently expanded their use field because they have advantages over solution-type coatings in that their application is associated with no danger of fire hazard nor of toxicity and, moreover, they are applied with a high working efficiency. Among them, particularly a thermosettable acrylic resin was considered to be most promising in view of gloss, weatherability, chemical resistance, and mechanical strengths of the coating film. Accordingly, various attempts have been made to develop thermosettable acrylic resins for powder coating.

Among such thermosettable acrylic resin compositions for powder coating, there have heretofore been proposed most generally those compositions which comprise an acrylic copolymer of an alkyl acrylate or methacrylate with a glycidyl acrylate or methacrylate and a curing agent (for example, German Patent Application Laid-Open (Offenlegung) Nos. 2,057,577 and 2,064,916; Japanese Patent Application Laid-Open No. 26,439/72). These compositions, however, give coating films that are insufficient in surface leveling and adhesion to metals.

There have been also proposed compositions comprising a so-called auto-crosslinkable acrylic resin containing multiple types of crosslinkable functional groups and a flow controlling agent (for example, Japanese Patent Application Laid-Open Nos. 29,839/73, 29,840/73, and 29,841/73). However, because of insufficient progress of cure, the coating film obtained by use of such auto-crosslinkable acrylic resins is unsatisfactory in strength and surface leveling.

Under the circumstances stated above, the present inventors conducted various experiments to find out a thermosettable acrylic resin composition for powder coating which is free from the aforesaid disadvantages and as a result found that it is possible to improve a composition for powder coating comprising essentially of an acrylic resin and a curing agent to be able to form a coating film excellent in strength, adhesion, and surface leveling, by use of an acrylic copolymer resin comprising specified amounts of an epoxy-containing monomeric component and another monomeric component containing a carboxyl or acid anhydride group, the gram equivalent ratio between the carboxyl content and the epoxy content of the resin being in a specified range. Thus, the present invention was accomplished.

An object of this invention is to provide a thermosettable acrylic resin composition for powder coating, which gives a coating film excellent in strength, adhesion, and surface leveling.

Other objects of this invention will become apparent from the following description.

The thermosettable acrylic resin composition of this invention is a mixture comprising (A) 100 parts by weight of an acrylic resin having a glass transition temperature of 10° to 75° C. and containing (a) 2 to 28% by weight of a monomeric component containing epoxy group and (b) 0.1 to 8% by weight of a monomeric component containing carboxyl or acid anhydride group, the gram equivalent ratio of said carboxyl groups to said expoxy groups contained in the resin being in the range from 1/2 to 1/20 (provided that the gram equivalent of an acid anhydride group is assumed to be equivalent to 2 gram equivalents of the carboxyl group) and (B) 0.5 to 25 parts by weight of a curing agent capable of crosslinking said acrylic resin (A). The said composition may contain, if necessary, an anti-blocking agent, surface leveling agent, plasticizer, pigment and the like.

The acrylic resin (A), which constitutes one of the constituents of the present thermosettable acrylic resin composition, is that having a glass transistion temperature of 10° to 75° C. and a weight-average molecular weight of 8,000 to 100,000 and containing (a) 2 to 28%, preferably 8 to 25%, by weight of a monomeric component containing epoxy group and (b) 0.1 to 8%, preferably 1 to 6%, by weight of a monomeric component containing carboxyl or acid anhydride group, the gram equivalent ratio of said carboxyl groups to said epoxy groups contained in the resin being 1/2 to 1/20, preferably from 1/4 to 1/10.

The object of introducing (a) a monomeric component containing epoxy group and (b) a monomeric component containing carboxyl or acid anhydride group into the acrylic resin is to produce in the resin itself proper amounts of intra- and inter-molecular crosslinkages which bring about improvement of the coating film in surface leveling as well as in strength and adhesion. Such effects can be provided by the acrylic resin specified above. When the epoxy-containing monomeric component (a) is reduced in amount of less than 2% by weight of the resin, the strength and adhesion of the coating film are decreased, while when it is increased in amount of more than 28% by weight, the surface leveling of the film is deteriorated due to over-cure of the resin. On the other hand, when the monomeric component (b) containing carboxyl or acid anhydride groups is reduced in amounts of less than 0.1% by weight of the resin, adhesion of the coating film is decreased, while when it is increased in amounts of more than 8% by weight of the resin, the surface leveling tends to be deteriorated owing to over-cure of the resin.

Further, in the acrylic resin to be used in the composition of this invention, the gram equivalent ratio between the carboxyl groups and epoxy groups contained in the resin is an important factor to impart to the coating film an excellent adherence, surface leveling, and strength. A gram-equivalent ratio falling outside the range from 1/2 to 1/20 is undesirable because of deterioration particularly in surface leveling of the coating film.

When blocking tendency of the composition, and flow characteristics of the compostion during baking are taken into consideration, it is preferable to use an acrylic resin having a glass transistion temperature of 10° to 75° C. and a melt index of 1 to 100.

When the weight-average molecular weight of the acrylic resin is below 8,000 the strength and chemical resistance of the coating film and the storage stability of the composition are reduced, while when it exceeds 100,000, the surface leveling of the coating film is deteriorated.

The epoxy-containing monomers to be used in introducing epoxy groups in the present acrylic resin include glycidyl acrylate, glycidyl methacrylate, β-methylglycidyl acrylate, β-methylglycidyl methacrylate, N-glycidylacrylamide, allyl glycidyl ether, glycidyl vinylsulfonate, etc. These monomers are used each alone or in combinations of two or more.

The carboxyl-containing monomers to be used are acrylic acid, methacrylic acid, crotonic acid, itaconic acid, fumaric acid, maleic acid, citraconic acid, and the like; and monoalkyl esters of unsaturated dicarboxylic acids such as itaconic acid, fumaric acid, maleic acid, citraconic acid, and the like. The monomers containing an acid anhydride group to be used are itaconic anhydride, maleic anhydride, citraconic anhydride, etc. These monomers are used each alone or in combinations of two or more.

The nonfunctional monomers to be copolymerized with the functional monomers containing epoxy group and those containing carboxyl or acid anhydride group include esters of acrylic acid and methyacrylic acid, mixtures of these esters, and mixtures of these esters and other ethylenically unsaturated monomers. The esters of acrylic acid and methacrylic acid include methyl acrylate, ethyl acrylate, n-propyl acrylate, isopropyl acrylate, n-butyl acrylate, isobutyl acrylate, tert-butyl acrylate, hexyl acrylate, cyclohexyl acrylate, 2-ethylhexyl acrylate, octyl acrylate, 2-ethyloctyl acrylate, dodecyl acrylate, benzyl acrylate, phenyl acrylate, methyl methacrylate, ethyl methacrylate, n-propyl methacrylate, isopropyl methacrylate, n-butyl methacrylate, isobutyl methacrylate, tert-butyl methacrylate, hexyl methacrylate, cyclohexyl methacrylate, 2-ethylhexyl methacrylate, octyl methacrylate, 2-ethyloctyl methacrylate, dodecyl methacrylate, benzyl methacrylate, phenyl methacrylate, etc. These esters are used each alone or in combinations of two or more and contained in the resin in an amount of about 20 to 97%, preferably 50 to 95%, by weight.

The above-said other ethylenically unsaturated monomers include aromatic vinyl monomers such as styrene and vinyltoluene; acrylonitrile, methacrylonitrile; aliphatic vinyl esters such as vinyl acetate; α-olefins such as ethylene and propylene; halogen-containing vinyl monomers such as vinyl fluoride, vinyl chloride, and monochlorotrifluoroethylene; and alkyl vinyl ethers such as lauryl vinyl ether. These monomers are used each alone or in combinations of two or more and are contained in the resin in an amount of about 0 to 65% by weight.

Preparation of the acrylic resin (A) can be carried out by the methods usually employed for polymerization of acrylic monomers, such as those of suspension, emulsion, solution, and bulk polymerization. Particularly preferred are suspension and emulsion polymerization methods. Melt index of the acrylic resin can be controlled by conducting the polymerization in the presence of chain transfer agents including mercaptans such as dodecyl mercaptan, disulfides such as dibenzoyl disulfide, $C_1$- to $C_{18}$- alkyl ester of thioglycolic acid such as 2-ethylhexyl thioglycolate, and halohydrocarbons such as carbon tetrabromide and carbon tetrachloride; or in the presence of organic solvents having suitable chain transfer effect, such as isopropyl alcohol, isopropylbenzene, and toluene.

The curing agent (B), which is another constituent of the present composition and capable of crosslinking the acrylic resin, is used in this invention for the purpose of imparting, by crosslinking the acrylic resin (A), to the coating film excellent performance characteristics such as improved film strength, surface leveling, etc. Such curing agents (B) include polycarboxylic acids, anhydrides thereof, and polycarboxylic acid hydrazides.

When blocking tendency of the composition, and flow characteristic of the composition during backing are taken into consideration, it is preferable, however, to use a polycarboxylic acid or anhydride thereof having a melting point of 65° to 190° C, preferably 80° to 170° C.

The above-noted polycarboxylic acids and anhydrides thereof include polycarboxylic acids such as succinic acid, glutaric acid, adipic acid, pimelic acid, suberic acid, azelaic acid, sebacic acid, citric acid, maleic acid, citraconic acid, itaconic acid, glutaconic acid, hexahydrophthalic acid, cyclohexene-1,2-dicarboxylic acid, 1,10-decanedicarboxylic acid, and the like; acid anhydrides such as succinic anhydride, sebacic anhydride, itaconic anhydride, phthalic anhydride, trimellitic anhydride, and the like; and acrylic resins containing carboxyl or acid anhydride groups.

When a polycarboxylic acid having a melting point below 65° C. is used, blocking resistance of the powdered coating composition can no more be improved even by the addition of an antiblocking agent and, moreover, curing reaction is apt to occur during blending of such a polycarboxylic acid with the acrylic resin, while when a polycarboxylic acid having a melting point exceeding 190° C. is used, the resulting composition tends to require a higher baking temperature.

The curing agent (B) is used in an amount of 0.5 to 25 parts by weight for 100 parts by weight of the acrylic resin (A). If the amount is below 0.5 part by weight, the crosslinking reaction does not sufficiently proceed on baking, while if the amount exceeds 25 parts by weight, the crosslinking reaction proceeds so vigorously that the resulting coating film becomes inferior in performance characteristics, particularly in surface leveling.

The present composition can be incorporated, if necessary, with effective amounts of additives such as antiblocking agent, surface leveling agent, plasticizer, pigment, and the like, each alone or in combinations of two or more.

The antiblocking agents suitable for adding to the thermosettable acrylic resin composition for powder coating include aliphatic acid amides such as acetamide, propionamide, stearamide, arachamide, montanamide, and cerotamide; aliphatic bisamides such as diacetamide, bisoleamide, bislauramide, methylenebisstearamide, and ethylenebisstearamide; ester of higher aliphatic acids such as myricyl cerotate, butylene glycol dimontanate, and glyceryl tri-1,2-hydroxystearate; polyethylene and atactic polypropylene having a molecular weight of 1,000 to 10,000; and partial oxidation products of these polyolefins. The anti-blocking agent is added in an amount of 0.1 to 10 parts by weight for 100 parts by weight of the present resin composition.

In order to give proper colors, inorganic pigments such as titanium oxide, iron oxide, chromium oxide, and carbon black, or organic pigments such as Phthalocyanine Blue, Phthalocyanine Green, Cinquasia Red, and Quindo Red can be added to the present resin composition for powder coating. The coloring materials which can be added are not limited to those cited above.

The present powder coating composition can be admixed with plasticizers such as, for example, adipates, phosphates, phthalates, sebacates; polyesters obtained from adipic acid or azelaic acid; and epoxidized plasticizers.

The surface leveling agents which can be added to the present powder coating composition are homo- or co-oligomer of acrylic ester and styrene, metal salt of perfluorocarboxylic acid or perfluorosulfonic acid, and esters of perfluorocarboxylic acid with polyethyleneglycol or polypropyleneglycol. These compounds are added in an amount of 0.1 to 5 parts by weight to 100 parts by weight of the composition.

In present thermosettable acrylic resin composition for powder coating is prepared by adding, if necessary, an antiblocking agent, plasticizer, surface leveling agent such as acrylic oligomer or styrene oligomer or pigment to the aforesaid two constituents (A) and (B), melt-blending the resulting mixture at a melting temperature of 80° to 130° C., then cooling and grinding to pass through generally a 100-mesh screen, or alternatively, by first grinding each ingredient to a powder of appropriate size, e.g. 100 to 150 mesh, and mixing the powdered ingredients. Of these two procedures, the former is more suitable. A hot roll mill, hot kneader, or extruder can be used as the melt-blending equipment.

The powder coating composition thus obtained is applied by known techniques such as electrostatic spray coating and fluidized bed coating to deposit the powder on a substrate material and then cured by heating to form the coating film. Baking of the present thermosettable resin composition for powder coating is carried out at 150° to 220° C. for ordinarily 10 to 50 minutes, whereby curing reaction between the acrylic resin and the curing agent is completed.

As stated above, the present thermosettable acrylic resin composition comprising the acrylic resin (A), the curing agent (B), and, if necessary, other constituents contains epoxy groups and carboxyl or acid anhydride groups in the resin. A part of these groups crosslinks autogenously and the remaining part crosslinks by means of the curing agent. Owing to the well-balanced ratio between the said functional groups, the composition rapidly becomes fluid on baking, forming a smooth coating layer which sets quickly to give a cured coating film excellent in gloss, leveling, chemical resistance, weatherability, and having attractive appearance, satisfactory strength, and improved adherence to metals. Such remarkable characteristics of the coating film are the manifestation of the advantages of the present composition.

The invention is illustrated below in further detail with reference to Examples. In Examples, all parts are by weight.

Physical properties shown in Examples were measured by the following methods.

Glass transition temperature (° C.): measured by use of a differential thermoanalyzer.

Melt index: measured according to ASTM D 1238, under the measuring conditions B.

Surface leveling of the coating film; visually evaluated.

Gloss, hardness by pencil test, and impact resistance: measured according to JIS K 5400.

Erichsen value: After having been kept in a constant-temperature and -humidity cabinet, at 20° C. and 75% relative humidity, for one hour, the coated panel was mounted on an Erichsen tester with the coated side outward. A punching rod, about 10 mm in radius of curvature, was allowed to thrust against backside of the panel at a rate of 0.1 mm/sec. until the projected portion of the coating film shows spalling. The maximum displacement, in mm, of the punch was measured.

Cross cut test: After a coated test specimen had been kept in a constant-temperature and -humidity cabinet, at 20° C. and 75% relative humidity, for one hour, a checkerwise pattern with 100 checks, each 1 mm square, was cut by means of a cutter in the coating film in an area covering 10 mm × 10 mm. The peel test was conducted by use of a piece of adhesive cellophane tape and the number of checks where the film remained on the panel was counted.

EXAMPLE 1

1. Preparation of acrylic resin

Into a 100-liter glass-lined autoclave provided with a stirrer, were charged a quantity of a monomer, shown in Table 1, 1.5 parts of lauroyl peroxide (polymerization initiator), 3.0 parts of 2-ethylhexyl thioglycolate (chain transfer agent), 0.07 part of poly(sodium acrylate) (dispersing agent), and 150 parts of ion-exchanged water. After the air in the autoclave had been replaced with nitrogen, the temperature in the autoclave was elevated to 70° C. with stirring and polymerization was allowed to proceed for 6 hours.

After the polymerization had been completed and the autoclave had been colled, the contents were withdrawn, filtered, and washed with water to obtain a white solid acrylic copolymer. The epoxy-containing monomeric component content of the acrylic copolymer, the gram equivalent ratio of carboxyl groups to epoxy groups in the copolymer, the glass transition point and melt index of the copolymer were as shown in Table 1.

Table 1

| Monomer charged | Example 1 | | | | | | | Comparative Example | | | |
|---|---|---|---|---|---|---|---|---|---|---|---|
| | A | B | C | D | E | F | G | H | I | J | K |
| Glycidyl acrylate | 5.0 | | | | 20.0 | 20.0 | 20.0 | 8.0 | | 0.5 | |
| Glycidyl methacrylate | | 14.0 | 14.0 | 14.0 | | | | | 14.0 | | 30.0 |
| Acrylic acid | 0.6 | 0.5 | 1.0 | 1.8 | | | | 4.5 | 0.3 | | |
| Methacrylic acid | | | | | 0.9 | 1.9 | 3.4 | | | 0.1 | 2.6 |
| Methyl acrylate | | | | 40.2 | | | | 37.5 | | | |
| Methyl methacrylate | 69.4 | 60.5 | 50.0 | 44.0 | 50.0 | 38.0 | 50.6 | 50.0 | 50.0 | 64.4 | 50.4 |
| Ethyl acrylate | | | 35.0 | | 29.1 | 40.1 | 26.0 | | 35.7 | 35.0 | |
| Butyl acrylate | 25.0 | 25.0 | | | | | | | | | 17.0 |
| Property of copolymers | | | | | | | | | | | |
| Epoxy-containing monomeric component content (% by wt.) | 5 | 14 | 14 | 14 | 20 | 20 | 20 | 8 | 14 | 0.5 | 30 |
| Carboxyl/epoxy (gram equiv. ratio) | 1/5 | 1/15 | 1/7 | 1/4 | 1/15 | 1/7 | 1/4 | 1/1 | 1/28 | 1/4 | 1/7 |
| Glass transition temperature (° C.) | 46 | 43 | 44 | 40 | 45 | 32 | 54 | 42 | 40 | 43 | 57 |
| Melt index | 23 | 40 | 65 | 67 | 45 | 82 | 33 | 38 | 74 | 54 | 18 |
| Weight-average | 18,000 | 16,500 | 16,500 | 15,000 | 16,000 | 16,000 | 13,500 | 17,000 | 17,000 | 17,500 | 26,000 |

2. Preparation of powder coating composition and evaluation of coating film:

To 100 parts of each of the acrylic resins A to K prepared by the procedure mentioned in 1), were added 7 parts of adipic acid, 3 parts of bisstearamide, and 30 parts of titanium oxide. After having been melt blended at 100° C. for 10 minutes, the mixture was cooled and ground to a powder, 100μ or less in particle size, to obtain a powder coating composition.

The powder coating composition obtained as mentioned above was electrostatically applied on a cold rolled sheet steel degreased with toluene, and baked at 180° C. for 20 minutes to form a coating film, 60μ in thickness. The results of tests conducted on the coating film were as shown in Table 2.

EXAMPLE 2

Preparation of powder coating composition and evaluation of coating film:

To 100 parts of the acrylic resin C obtained in Example 1, were added 3 parts of montanate ester wax, 30 parts of titanium oxide, and a quantity (shown in Table 3) of each of the curing agents shown in Table 3. The mixture was melt blended at 100° C. for 10 minutes, cooled, and ground to a powder, 100μ or less in particle size, to obtain a powder coating composition.

The powder coating composition obtained as mentioned above was electrostatically applied on a cold rolled sheet steel degreased with toluene and then baked at 180° C. for 20 minutes to form a coating film, about 60μ in thickness. The results of tests conducted on the coating film were as shown in Table 3.

Table 2

| Performance characteristics of coating film | Example 1 | | | | | | | Comparative Example | | | |
|---|---|---|---|---|---|---|---|---|---|---|---|
| Resin used | A | B | C | D | E | F | G | H | I | J | K |
| Surface leveling | good | good | good | good | good | good | good | poor | poor | good | poor |
| Gloss (60-degree specular gloss) | 93 | 95 | 97 | 96 | 95 | 97 | 97 | 62 | 68 | 72 | 75 |
| Hardness by pencil test | 2H | 2H | 2H | 3H | 2H | 3H | 3H | 3H | HB | B | 2H |
| Impact resistance | 30 cm OK | 30 cm OK | 30 cm OK | 30 cm OK | 30 cm OK | 30 cm OK | 30 cm OK | 10 cm peeling | 20 cm peeling | 10 cm peeling | 20 cm peeling |
| Erichsen value (mm) | 6.0 | 7.0 | 7.0< | 7.0< | 6.5 | 7.0< | 7.0< | 0.2 | 2.5 | 0.2 | 3.0 |
| Adhesion by cross cut test | 100/100 | 100/100 | 100/100 | 100/100 | 100/100 | 100/100 | 100/100 | 100/100 | 70/100 | 0/100 | 100/100 |

From Table 2, it is seen that the compositions of this invention are excellent in performance characteristics of the coating film, whereas when the gram equivalent ratios of carboxyl groups to epoxy groups fall outside the range specified in this invention (Comparative Example, resins H and I), surface leveling of the coating film becomes markedly inferior and other properties of the coating film also become deteriorated. It is also seen that on the other hand, when the epoxy-or carboxyl-containing monomeric component content of the acrylic resin falls outside the specified range (resins J and K), the characteristics of the coating film become so inferior that such a composition is unsuitable for powder coating.

Table 3

| Experiment No. | Example 2 | | | | | | Comparative Example | |
|---|---|---|---|---|---|---|---|---|
|  | 1 | 2 | 3 | 4 | 5 | 6 | 7 | 8 |
| Curing agent |  |  |  |  |  |  |  |  |
| 1,10-Decanedicarboxylic acid | 8 |  |  |  |  | 15 |  |  |
| Adipic acid |  | 8 |  |  |  |  |  | 30 |
| Phthalic anhydride |  |  | 8 |  |  |  |  |  |
| Trimellitic anhydride |  |  |  | 5 |  |  |  |  |
| Cyclohexene-1,2-dicarboxylic acid |  |  |  |  | 8 |  |  |  |
| Performance characteristics of coating film |  |  |  |  |  |  |  |  |
| Surface leveling | good | good | good | good | good | good | good | bad |
| Gloss (60-deg. specular gloss) | 95 | 97 | 96 | 96 | 95 | 96 | 82 | 72 |
| Hardness by pencil test | 2H | 2H | 2H | 3H | 2H | 3H | B | H |
| Impact resistance | 30 cm OK | 30 cm OK | 30 cm OK | 30 cm OK | 30 cm OK | 30 cm OK | 10 cm peeling | 20 cm peeling |
| Erichsen value (mm) | 7.0< | 7.0< | 7.0< | 7/0< | 7.0< | 7.0< | 0.2 | 1.0 |
| Adhesion by Cross cut test | 100/100 | 100/100 | 100/100 | 100/100 | 100/100 | 100/100 | 20/100 | 90/100 |

From Table 3, it is seen that although several curing agents of the different type were used with the acrylic resin of this invention, performance characteristics of the coating film were likewise good without any deterioration. However, when none of the curing agents was used, the coating film was adversely affected in some of the properties such as, for example, hardness, as shown in Comparative Example (experiment No. 7), owing to insufficient progress of crosslinking. It is also seen that on the other hand, when a curing agent was used in excess (experiment No. 8), the coating film was deteriorated not only in surface leveling but also in other properties due to the excess curing agent remained in the film.

EXAMPLE 3

1. Preparation of acrylic resin:

Into a 100-liter glasslined autoclave provided with a stirrer, were charged each of the monomers shown in Table 4 (wherein quantity of the monomer is also shown), 1.5 parts of lauroyl peroxide (polymerization initiator), 3.0 parts of 2-ethylhexyl thioglycolate (chain transfer agent), 0.07 part of poly(sodium acrylate) (dispersing agent), and 150 parts of ion-exchanged water. After the air in the autoclave had been replaced with nitrogen, the temperature in the autoclave was elevated to 70° C. with stirring, and polymerization was allowed to proceed for 6 hours. After the polymerization had been completed and the autoclave had been cooled, the contents were withdrawn, filtered, and washed with water to obtain a white solid copolymer.

2. Preparation of powder coating composition and evaluation of coating film:

To 100 parts of each of the acrylic resins L to Q prepared by the procedure mentioned in 1), were added each of the curing agents shown in Table 5 (wherein the quantity is also shown), 2 parts of polyvinyl butyral, 0.1 part of a liquid acrylic oligomer, and 30 parts of titanium oxide. After having been melt blended at 100° C. for 10 minutes, the mixture was cooled and ground to a powder, 100 μ or less in particle size, to obtain a powder coating composition.

The powder coating composition obtained as mentioned above was electrostatically applied on a cold rolled sheet degreased with toluene, and baked at 180° C. for 20 minutes to form a coating film, about 60 μ in thickness. The results of tests conducted on the coating film were as shown in Table 5.

Table 4

| Monomer charged | Example 3 |  |  |  |  |  |
|---|---|---|---|---|---|---|
|  | L | M | N | O | P | Q |
| Glycidyl acrylate | 9.2 | 18.0 |  |  |  | 14.8 |
| Glycidyl methacrylate |  |  | 15.7 |  | 14.0 |  |
| Allyl glycidyl ether |  |  |  | 10.5 |  |  |
| Acrylic acid | 0.8 |  |  | 1.5 |  |  |
| Methacrylic acid |  | 2.0 | 1.8 |  |  |  |
| Fumaric acid |  |  |  |  | 1.0 |  |
| Maleic acid |  |  |  |  |  | 1.2 |
| Methyl acrylate |  |  |  |  |  | 40.0 |
| Methyl methacrylate | 35.0 |  | 32.5 |  | 50.0 |  |
| Ethyl acrylate |  |  |  | 56.5 | 20.0 |  |
| Ethyl methacrylate |  |  |  |  |  | 39.0 |
| Butyl acrylate |  |  | 30.0 |  |  |  |
| Butyl methacrylate | 55.0 | 50.5 |  |  |  |  |
| 2-Ethylhexyl acrylate |  |  |  |  | 24.5 |  |
| Monomer charged |  |  |  |  |  |  |
| Styrene |  | 29.5 | 20.0 |  |  |  |
| α-Methylstyrene |  |  |  | 17.0 |  |  |
| Vinylstyrene |  |  |  |  | 15.0 |  |
| Acrylonitrile |  |  |  |  |  | 5.0 |
| Properties of copolymer |  |  |  |  |  |  |
| Carboxyl/epoxy (gram equiv. ratio) | 1/6.5 | 1/6.0 | 1/5.3 | 1/4.4 | 1/5.7 | 1/5.6 |
| Glass transition temperature (° C.) | 43 | 45 | 42 | 38 | 48 | 45 |
| Melt index | 35 | 33 | 51 | 68 | 47 | 60 |
| Weight-average molecular weight | 35,000 | 50,000 | 19,500 | 18,000 | 14,000 | 22,000 |

Table 5

| Resin used | Example 3 |  |  |  |  |  |
|---|---|---|---|---|---|---|
|  | L | M | N | O | P | Q |
| Curing agent | Azelaic acid | 1,10-Decane-dicarboxylic acid | Adipic acid | Phthalic anhydride | Sebacic acid | Adipic acid |
| Parts | 8 | 10 | 8 | 5 | 8 | 8 |
| Performance characteristics of coating film |  |  |  |  |  |  |
| Surface leveling | good | good | good | good | good | good |
| Gloss (60-deg. specular gloss) | 94 | 96 | 96 | 93 | 97 | 95 |
| Hardness by pencil test | 2H | 2H | 3H | 2H | 2H | 3H |
| Impact resistance | 30 cm OK | 30 cm OK | 30 cm OK | 30 cm OK | 30 cm OK | 30 cm OK |
| Erichsen value (mm) | 7.0< | 7.0< | 7.0< | 7.0< | 7.0< | 7.0< |
| Adhesion by Cross-cut test | 100/100 | 100/100 | 100/100 | 100/100 | 100/100 | 100/100 |

From Table 5, it is apparent that even when various monomers other than acrylates and methacrylates had been used in preparing the present acrylic resin, there were obtained favorable coating films.

What is claimed is:

1. A powdered thermosettable acrylic resin composition for powder coating comprising a mixture consisting essentially of
   A. 100 parts by weight of an acrylic resin having a glass transition temperature of 10° to 75° C and a weight average molecular weight of from 8,000 to 100,000, made by copolymerizing at least one nonfunctional monomer selected from the group consisting of methyl acrylate, ethyl acrylate, n-propyl acrylate, isopropyl acrylate, n-butyl acrylate, isobutyl acrylate, tert-butyl acrylate, hexyl acrylate, cyclohexyl acrylate, 2-ethylhexyl acrylate, octyl acrylate, 2-ethyloctyl acrylate, dodecyl acrylate, benzyl acrylate, phenyl acrylate, methyl methacrylate, ethyl methacrylate, n-propyl methacrylate, isopropyl methacrylate, n-butyl methacrylate, isobutyl methacrylate, tert-butyl methacrylate, hexyl methacrylate, cyclohexyl methacrylate, 2-ethylhexyl methacrylate, octyl methacrylate, 2-ethyloctyl methacrylate, dodecyl methacrylate, benzyl methacrylate, and phenyl methacrylate in an amount of about 20 to 97% by weight based on said acrylic resin with (a) at least one monomer containing an epoxy group selected from the group consisting of glycidyl acrylate, glycidyl methacrylate, β-methylglycidyl acrylate, β-methylglycidyl methacrylte, n-glycidylacrylamide, allyl glycidyl ether, and glycidyl vinylsulfonate in an amount of 2 to 28% by weight based on said acrylic resin and (b) at least one monomer containing a carboxyl group or an acid anhydride group selected from the group consisting of acrylic acid, methacrylic acid, crotonic acid, itaconic acid, fumaric acid, maleic acid, citraconic acid, monoalkyl itaconates, monoalkyl fumarates, monoalkyl maleates, monoalkyl citraconates, itaconic anhydride, maleic anhydride, and citraconic anhydride in an amount of 0.1 to 8% by weight based on said acrylic resin, wherein the gram equivalent ratio of said carboxyl groups to said epoxy groups in said acrylic resin is in the range from 1/2 to 1/20 (provided that the gram equivalent of an acid anhydride group is assumed to be equivalent to 2 gram equivalents of the carboxyl group) and B. 0.5 to 25 parts by weight of a curing agent selected from the group consisting of polycarboxylic acids, anhydrides or polycarboxylic acids, and polycarboxylic hydrazides.

2. A composition according to claim 1, wherein nonfunctional monomer, which is copolymerized with (a) the functional monomer containing an epoxy group and (b) that containing a carboxyl or acid anhydride group to form the acrylic resin, comprises a mixture of said nonfunctional monomer and 0–65% by weight based on the acrylic resin of another ethelenically unsaturated monomer is (c) at least one member selected from the group consisting of esters of acrylic acid and esters of methacrylic acid or (d) a mixture of (c) and an ethylenically unsaturated monomer.

3. A composition according to claim 2, wherein said nonfunctional monomer is an ester of acrylic acid.

4. A composition according to claim 2, wherein said nonfunctional monomer is the ester of methacrylic acid.

5. A composition according to claim 2, wherein the other ethylenically unsaturated monomer is at least one member selected from the group consisting of styrene, vinyltoluene, acrylonitrile, methacrylonitrile, vinyl acetate, ethylene, propylene, vinyl fluoride, vinyl chloride, and lauryl vinyl ether.

6. A composition according to claim 1, wherein melt index of the acrylic resin is 1 to 100.

7. A composition according to claim 1, wherein in order to control melt index of the acrylic resin, said resin is prepared by polymerization in the presence of a chain transfer agent or an organic solvent having a sufficient chain-transfer effect.

8. A composition according to claim 7, wherein the chain transfer agent is dodecyl mercaptan, dibenzoyl disulfide, 2-ethylhexyl thioglycolate, carbon tetrabromide, or carbon tetrachloride.

9. A composition according to claim 7, wherein the organic solvent is isopropyl alcohol, isopropylbenzene, or toluene.

10. A composition according to claim 1, wherein the polycarboxylic acid or anhydride thereof has a melting point of 65° to 190° C.

11. A composition according to claim 10, wherein the polycarboxylic acid or anhydride thereof is succinic acid, glutaric acid, adipic acid, pimelic acid, suberic acid, azelaic acid, sebacic acid, citric acid, maleic acid, citraconic acid, itaconic acid, glutaconic acid, hexahydrophthalic acid, cyclohexene-1,2-dicarboxylic acid, 1,10-decanedicarboxylic acid, succinic anhydride, sebacic anhydride, itaconic anhydride, phthalic anhydride, trimellitic anhydride, or an acrylic resin containing carboxyl or acid anhydride groups.

12. A composition according to claim 1, which contains 0.1 to 10 parts by weight of an antiblocking agent based on the acrylic resin composition and/or 0.1 to 5 parts by weight of a surface leveling agent based on the acrylic resin composition.

13. A composition according to claim 1, which contains a plasticizer and/or a pigment.

14. A composition according to claim 13, wherein the plasticizer is an adipate, phosphate, phthalate, sebacate, or a polyester derived from adipic acid or azelaic acid.

15. A composition according to claim 12, wherein the surface leveling agent is homo- or co-oligmer of acrylic ester and styrene, metal salt of perfluorocarboxylic acid or perfluorosulfonic acid, and esters of perfluorocarboxylic acid with polyethyleneglycol or polypropyleneglycol.

16. A composition according to claim 1, wherein the mixture is melt blended in molten state at 80° to 130° C., cooled, and ground to pass through a 100-mesh screen.

17. A composition according to claim 1, wherein each ingredient of the mixture is previously ground to a powder of 100 to 150 mesh and then mixed together.

18. A composition according to claim 12, wherein the antiblocking agent is acetamide, propionamide, stearamide, arachamide, montanamide, cerotamide, diacetamide, bisoleamide, bislauramide, methylenebisstearamide, ethylenebisstearamide, myricyl cerotate, butylene glycol dimontanate, glyceryl tri-1,2-hydroxy stearate, polyethylene or atactic polypropylene having a molecular weight of 1,000 to 10,000, or a partial oxidation product of these polyolefins.

* * * * *